United States Patent [19]
Reynolds, III et al.

[11] Patent Number: 5,488,377
[45] Date of Patent: Jan. 30, 1996

[54] METHOD AND APPARATUS FOR CONTROLLING THE FALSE ALARM RATE OF A RECEIVER

[75] Inventors: Albert H. Reynolds, III, St. Louis; Rand E. Boettger, Florissant, both of Mo.; Steven W. Pauly, St. Petersburg, Fla.

[73] Assignee: McDonnell Douglas Corporation, St. Louis, Mo.

[21] Appl. No.: 412,418

[22] Filed: Mar. 28, 1995

[51] Int. Cl.⁶ .............................. G01S 7/34; G01S 15/00
[52] U.S. Cl. .................... 342/93; 342/91; 367/98
[58] Field of Search .................... 342/89, 91, 93, 342/159; 367/98, 97

[56] References Cited

U.S. PATENT DOCUMENTS

| | | | |
|---|---|---|---|
| 4,489,319 | 12/1984 | Hansen | 342/93 |
| 4,586,043 | 4/1986 | Wolf | 342/93 |
| 5,337,251 | 8/1994 | Pastor | 364/484 |

*Primary Examiner*—Ian J. Lobo
*Attorney, Agent, or Firm*—Bell, Seltzer, Park & Gibson

[57] ABSTRACT

A method and apparatus for controlling the false alarm rate of a receiver which detects each received signal having a power level greater than a predetermined threshold level which is received within a predetermined detection interval. The receiver is adapted to receive signals in response to source signals having a predetermined transmission period. The signals detected within each transmission period can include an initial signal and a plurality of excess signals received subsequent to the initial signal. The total number of detected signals and the number of excess signals received within the predetermined detection interval are counted and a ratio therebetween is determined. Based upon the ratio of the total number of signals to the number of excess signals, the relationship between the power level of the received signals and the threshold level is adjusted in order to control the false alarm rate of the receiver. In one embodiment, the threshold level is adjusted based upon the ratio of the total number of received signals to the total number of excess signals. In another embodiment, the amplification or attenuation of the received signals is adjusted in response to the ratio of the total number of received signals to the total number of excess signals.

20 Claims, 5 Drawing Sheets

METHOD AND APPARATUS FOR CONTROLLING THE FALSE ALARM RATE OF A RECEIVER

GOVERNMENT RIGHTS

The United States Government has rights in this invention pursuant to Contract No. MDA972-90-C-0042 awarded by the Department of the Air Force.

FIELD OF THE INVENTION

The present invention relates generally to methods and apparatus for controlling the false alarm rate of a receiver and, more particularly, to methods and apparatus for controlling the false alarm rate of a threshold-detection receiver.

BACKGROUND OF THE INVENTION

A number of receivers detect signals by comparing the signals which are received with a predetermined power level. Based on this comparison, only those signals which have a power level greater than a predetermined threshold level are detected and processed. For example, threshold-detection receivers of conventional radar and laser radar (ladar) systems detect return signals which were transmitted by a radar transmitter, which have reflected from a distant object and which have a power level greater than a predetermined threshold level. In addition, certain types of communications systems employ threshold-detection receivers to detect communications signals which were transmitted by a communications source, such as a radio transmitter, and which have a power level greater than a predetermined threshold level.

In addition to the true signals, such as the return or reflected signals in a radar or ladar system and the communications signals in a communications system, there are numerous other signal sources which emit extraneous signals which a receiver can detect. For example, the frequency bandwidths in which radar, ladar and communications systems operate typically include numerous sources of noise. The noise sources can produce a variety of noise signals, at least some of which have a power level which exceeds the predetermined threshold level so as to be detected and processed by a threshold-detection receiver. Although the detected noise signals have a power level greater than the predetermined threshold level, the noise signals do not provide additional, useful information. Instead, the noise signals may distort or otherwise dilute the reception of true signals by the receiver.

Accordingly, designers and operators of systems which employ threshold-detection receivers in relatively noisy environments must perform a delicate balancing act, That is, the predetermined threshold level must be low enough such that a relatively high percentage, if not all, of the true signals received by the receiver have a power level greater than the predetermined threshold level and are detected and processed by the receiver. It will be apparent to those skilled in the art, however, that the lower the predetermined threshold level is set, the more noise signals which have a power level exceeding the predetermined threshold level will be detected by the receiver, thereby further skewing the results.

Accordingly, designers and operators of systems which employ threshold-detection receivers typically design such systems to operate effectively at a predetermined false alarm rate. As known to those skilled in the art, the false alarm rate is the rate at which noise or other extraneous signals are detected by a threshold-detection receiver. Preferably, the predetermined false alarm rate remains constant to further improve the detection of the true signals.

Typically, the false alarm rate is based upon the noise statistics, the ratio of the predetermined threshold level to the root mean square of the noise voltage and the bandwidth of the receiver. Since noise statistics can vary dramatically between noise sources, the noise statistics generally fluctuate as different noise sources emerge. In addition, the noise statistics can change significantly with variations in the temperature, time, background, jamming and other variables. Consequently, it has been relatively difficult to obtain the constant false alarm rate in systems employing threshold-detection receivers due to, among other things, the sizable fluctuations in the noise statistics.

Nonetheless, several methods have been proposed which attempt to maintain constant false alarm rates for threshold-detection receivers. According to one conventional approach, the predetermined threshold level is based upon a multiple of the average power of the received signals. However, signals which have very high power levels may skew the predetermined threshold level such that the threshold level is set to an excessively high level, thereby potentially causing the receiver to miss or fail to detect several true returns. In addition, by not measuring and controlling the true false alarm rate, but, instead, measuring a parameter related to the false alarm rate, i.e., the average power of the received signals, the true false alarm rate of this approach can vary greatly, such as by a factor of 100, as the percentage of true signals detected by the threshold-detection receiver varies between 0% and 100%.

Further, there are a variety of types of noise signals. For example, a first type of noise signal can include those noise signals introduced by the various components of the receiver, including the filter and the square log detector. In addition, a second type of noise signals is Gaussian noise. These different noise types are generally independent such that both types of noise signal can vary irrespective of the other type of noise signal.

Thus, the conventional approach of basing the predetermined threshold level on a multiple of the average power of the received signals does not take into account the different types of noise signals and the various independent fluctuations which each of the types of noise signals can undergo. Instead, this approach is typically based upon the assumption that the noise statistics are independent of the noise source. In addition, this approach generally assumes that the noise statistics do not change with time such that an average power of the received signals can be determined over one time period and can thereafter be employed in subsequent time periods to determine the predetermined threshold level.

A second method of obtaining a constant false alarm rate for a threshold-detection receiver is generally employed by systems having a relatively low pulse rate and a limited range, such as a ladar system operating at 10 Hz and having a maximum range of 10 kilometers. Due to the relatively low pulse rate and limited range, there is a relatively long dead time between the reception of a true signal and the transmission of the succeeding signal. For example, in the exemplary ladar system operating at 10 Hz and having a maximum range of 10 kilometers, each true signal, i.e., each return or reflected signal, would be received within much less than 1 millisecond. However, the succeeding signal would not be transmitted for at least another 99 milliseconds.

According to this second method of obtaining a constant false alarm rate, all of the signals received by the threshold-detection receiver within the dead period between pulses represents undesirable noise signals. Based upon the noise signals detected in the dead period, the true false alarm rate can be measured. However, this method cannot effectively be employed with threshold-detection receivers which operate at relatively high sampling rates, that is, threshold-detection receivers which could receive a true signal at virtually any time.

SUMMARY OF THE INVENTION

It is therefore an object of the present invention to provide an improved method and apparatus for controlling a threshold-detection receiver.

It is another object of the present invention to provide an improved method and apparatus for controlling the false alarm rate of a threshold-detection receiver.

It is yet another object of one embodiment of the present invention to provide an improved method and apparatus for controlling the false alarm rate of a threshold-detection receiver which operates at a relatively high sampling rate.

It is a still further object of one embodiment of the present invention to provide an improved method and apparatus for controlling the false alarm rate of a threshold-detection receiver which does not vary significantly as the probability of detecting true signals fluctuates.

These and other objects are provided, according to the present invention, by a method and apparatus for controlling the false alarm rate of a receiver by adjusting the relationship of the power level of the received signals to the predetermined threshold level of the receiver. This relationship is adjusted in response to a ratio of the total number of signals received by the receiver to the total number of excess signals received by the receiver within a predetermined detection interval.

The receiver is generally adapted to receive signals in response to source signals transmitted at a predetermined transmission frequency. The predetermined transmission frequency thereby defines a predetermined transmission period between source signals. The predetermined detection interval typically includes at least one predetermined transmission period.

One embodiment of the false alarm rate controller includes total signal detecting means for detecting each received signal which has a power level greater than the predetermined threshold level and which is received within a predetermined detection interval. The signals received within a predetermined transmission period can include an initial signal which has a power level greater than the predetermined threshold level and a plurality of excess signals received subsequent to the initial signal which also have a power level greater than the predetermined threshold level. The false alarm rate controller of this embodiment of the present invention also includes excess signal detecting means for detecting each excess signal which is received within the predetermined detection interval.

Further, the false alarm rate controller of the present invention preferably includes ratio determining means and threshold adjusting means. The ratio determining means determines a ratio of the total number of received signals to the total number of excess signals. Based upon this ratio, the threshold adjusting means adjusts the relationship between the power level of the received signals and the threshold level such that the false alarm rate of the receiver is thereby controlled. In one embodiment, the threshold adjusting means can include comparison means for comparing the ratio determined by the ratio determining means to a predetermined ratio.

According to a first embodiment, the threshold adjusting means adjusts the threshold level based upon the ratio of the total number of received signals to the total number of excess signals. More particularly, the threshold adjusting means of this embodiment can further include a first adjusting means for decreasing the threshold level if the ratio determined by the ratio determining means is greater than the predetermined ratio. Likewise, the threshold adjusting means can also include a second adjusting means for increasing the threshold level if the ratio determined by the ratio determining means is less than the predetermined ratio. Consequently, the false alarm rate of the receiver can be controlled.

According to a second embodiment, the false alarm rate controller can include a comparator for detecting each received signal having a power level greater than the predetermined threshold level, and a detection interval timer for measuring the predetermined detection interval. Further, the false alarm rate controller of this embodiment can include a first counter for counting each signal detected by the comparator within the predetermined detection interval to thereby generate a total signal count, and a second counter for counting each excess signal which is received within the predetermined detection interval to thereby generate an excess signal count. Thus, according to this embodiment, the ratio determining means determines the ratio of the total signal count to the excess signal count and the threshold adjusting means adjusts the relationship between the power level of the received signals and the threshold level in response to the ratio of the total signal count to the excess signal count so as to thereby control the false alarm rate of the receiver.

According to one embodiment, the false alarm rate controller of the present invention can include an attenuator for controllably amplifying the received signals. The threshold adjusting means of this embodiment can include a controller for controlling the amplification of the received signals provided by the attenuator in response to the ratio of the total signal count to the excess signal count and, more particularly, in response to a comparison of the ratio of the total signal count to the excess signal count to a predetermined ratio. More specifically, the controller can include first adjusting means for increasing the amplification of the attenuator if the ratio of the total signal count to the excess signal count is greater than the predetermined ratio. Likewise, the controller can include second adjusting means for decreasing the amplification of the attenuator if the ratio of the total signal count to the excess signal count is less than the predetermined ratio. The false alarm rate controller of this embodiment of the present invention can also include suppression means for suppressing further detections by the comparator for a predetermined delay time following the detection of each received signal so as to thereby avoid counting a single detection more than once.

Therefore, the method and apparatus for controlling the false alarm rate of a receiver according to the present invention provides improved control of the false alarm rate such that the threshold-detection receiver can accurately detect true signals, such as return or reflected signals and communications signals. More specifically, the method and apparatus for controlling the false alarm rate of a receiver according to the present invention can readily control the false alarm rate of a receiver which receives signals at a relatively high pulse rate. In addition, the method and apparatus of the present invention measures and controls the true false alarm rate such that the false alarm rate does not vary significantly with fluctuations in the probability of detecting true signals.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
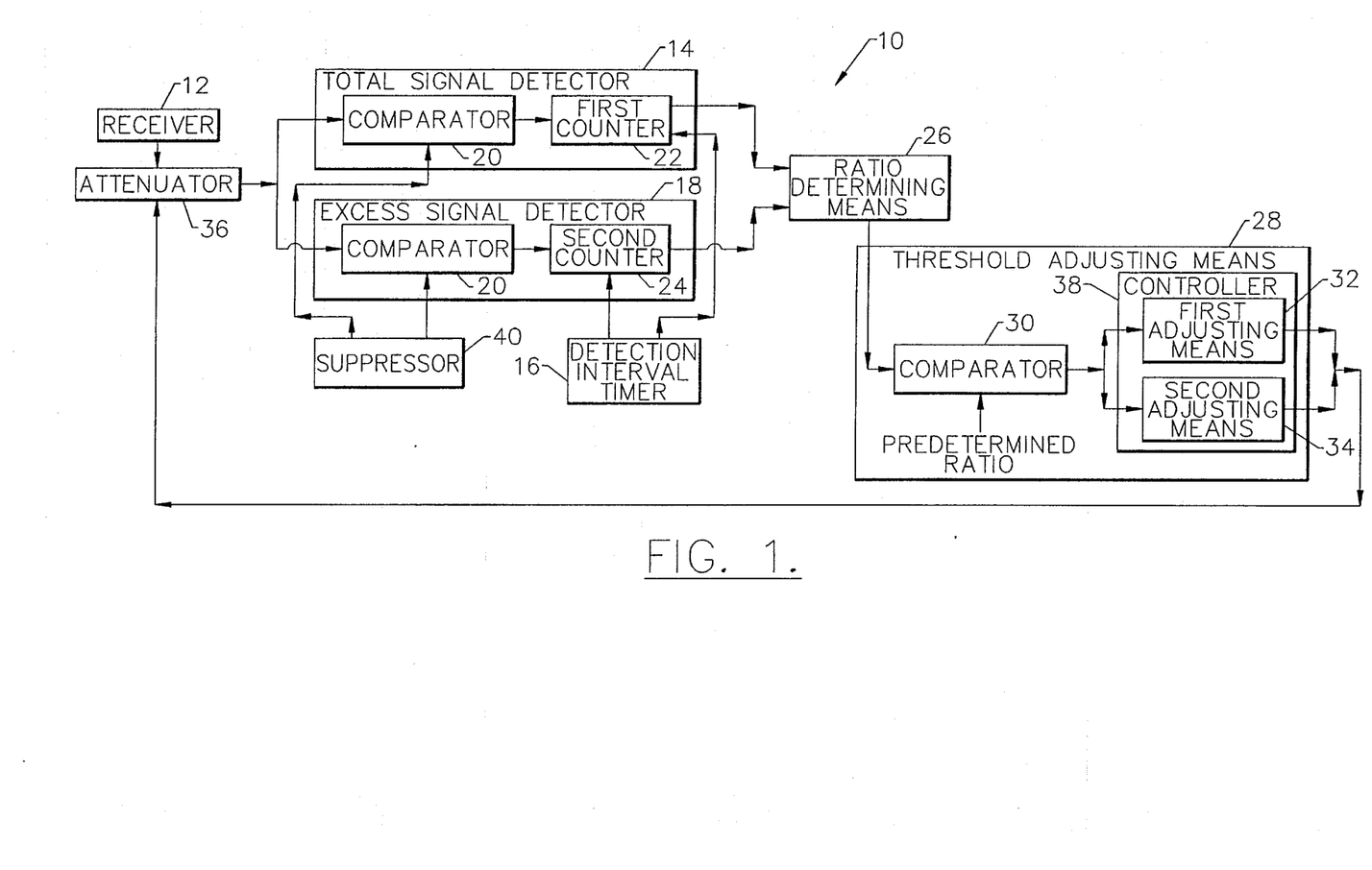
FIG. 1 is block diagram of an apparatus for controlling the false alarm rate of a receiver according to the present invention.

Referring now to FIG. 1, an apparatus 10 for controlling the false alarm rate of a receiver is illustrated. The receiver is typically a threshold-detection receiver, such as a ladar, radar or communications receiver, however, the method and apparatus of the present invention can be employed with other types of threshold-detection receivers without departing from the spirit and scope of the present invention.

The receiver can include receiving means 12 for receiving a plurality of signals. The signals include true signals transmitted in response to source signals. For example, the true signals can include returned or reflected signals, such as in a ladar/radar system, or communications signals in a communications system. Typically, the source signals are transmitted by a transmission source at a predetermined transmission frequency or pulse rate. The predetermined transmission frequency defines a predetermined transmission period between source signals. In addition, the receiving means generally receives noise signals from a variety of noise sources.

Figure 2:
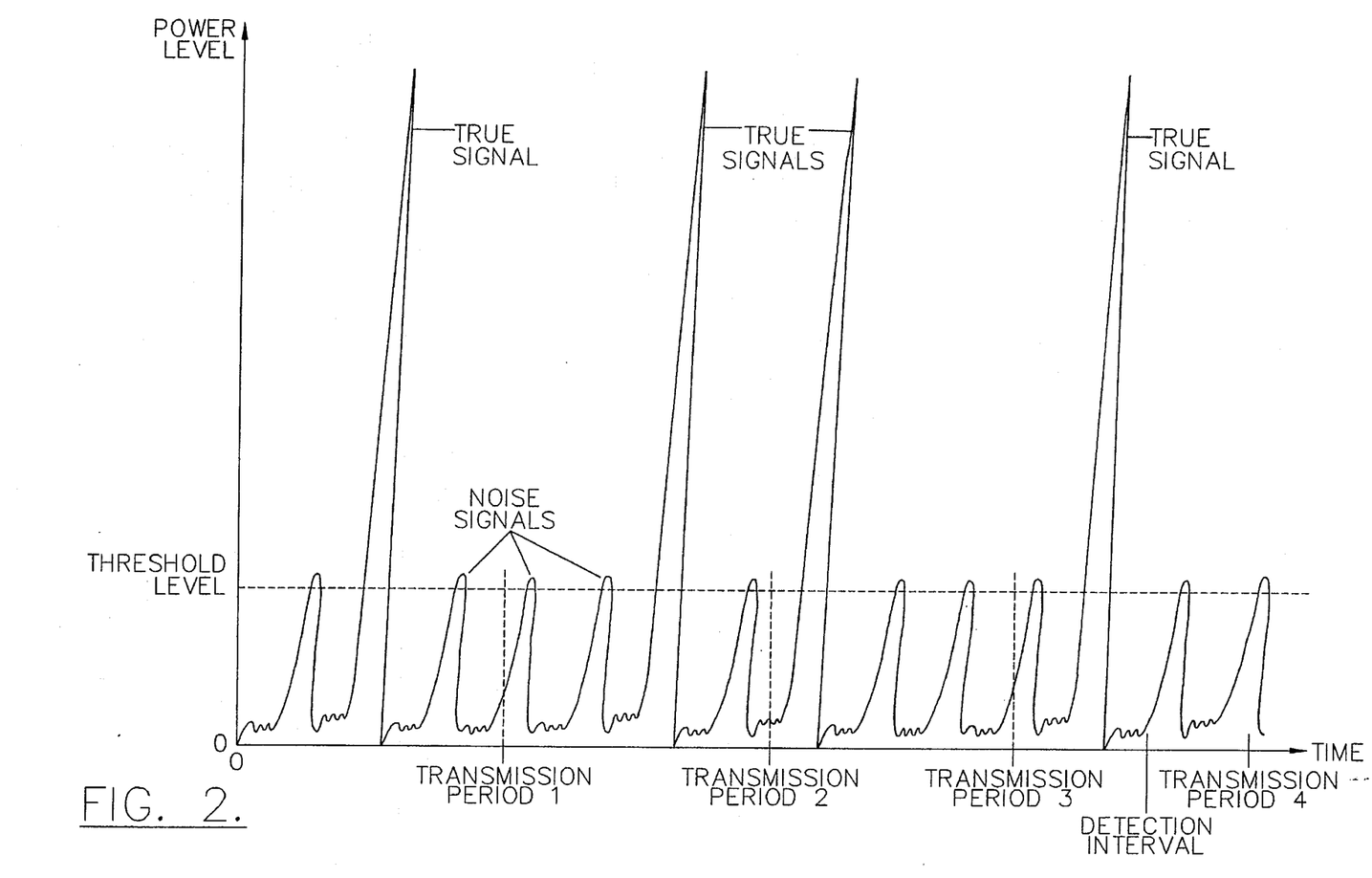
FIG. 2 is a graphical representation of a predetermined threshold level and signals received by a receiver, including true signals and noise signals.

The false alarm rate controller 10 of one embodiment of the present invention includes total signal detecting means 14 for detecting each received signal which has a power level greater than a predetermined threshold level and which is received within a predetermined detection interval. The predetermined detection interval is generally measured by a detection interval timer 16 which provides a reset signal upon the expiration of each predetermined detection interval. In addition, each predetermined detection interval generally includes at least one predetermined transmission period as illustrated in FIG. 2. For example, a detection interval can be one second for a receiver adapted to receive source signals transmitted at a frequency of 20 MHz and having a corresponding transmission period of 50 nanoseconds.

The signals received within a predetermined transmission period can include an initial signal which has a power level greater than the predetermined threshold level. In addition, the signals received within a predetermined transmission period can also include a plurality of excess signals received subsequent to the initial signal which also have a power level greater than the predetermined threshold level.

For example, as shown in FIG. 2, the first transmission period has three total signals and two excess signals; the second transmission period has four total signals and three excess signals; the third transmission period has three total signals and two excess signals; and the fourth transmission period has three total signals and two excess signals. However, the detection interval expires during the fourth transmission period such that there are twelve total signals and eight excess signals in the example of FIG. 2. As will be apparent to those skilled in the art, a detection interval will normally include many more transmission periods and many more signals may have power levels which exceed the predetermined threshold level in each transmission period than those illustrated in FIG. 2.

The total number of signals $N_{total}$ which are received having a power level greater than the predetermined threshold level can be calculated. More particularly, $N_{total}$ in the absence of source signals can generally be computed as:

$$N_{total} = T \cdot BW \cdot P_{fa} \tag{1}$$

wherein T is the predetermined detection interval, BW is the electronic bandwidth of the receiver and $P_{fa}$ is the probability that a noise signal exceeds the predetermined threshold level at any given time.

In addition, in the presence of source signals, $N_{total}$ can generally be computed as:

$$N_{total} = T \cdot PRF \cdot P_{det} + T \cdot BW \cdot P_{fa} \tag{2}$$

wherein PRF is the predetermined transmission frequency or pulse repetition frequency and $P_{det}$ is the probability of detecting a true signal.

For example, the total number of detected signals $N_{total}$ received per second by a receiver having an electronic bandwidth a 20 MHz and for source signals having a predetermined transmission frequency of 100 kHz are provided below as functions of $P_{fa}$ and $P_{det}$:

TABLE 1

| | TOTAL COUNTS | | | | | |
|---|---|---|---|---|---|---|
| $P_{fa}$ | $P_{det} = 0.0$ | $P_{det} = 0.2$ | $P_{det} = 0.4$ | $P_{det} = 0.6$ | $P_{det} = 0.8$ | $P_{det} = 1.0$ |
| $1 \times 10^{-6}$ | 20 | 20,020 | 40,020 | 60,020 | 80,020 | 100,020 |
| $2 \times 10^{-6}$ | 40 | 20,040 | 40,040 | 60,040 | 80,040 | 100,040 |
| $5 \times 10^{-6}$ | 100 | 20,100 | 40,100 | 60,100 | 80,100 | 100,100 |

TABLE 1-continued

| | TOTAL COUNTS | | | | | |
|---|---|---|---|---|---|---|
| $P_{fa}$ | $P_{det} = 0.0$ | $P_{det} = 0.2$ | $P_{det} = 0.4$ | $P_{det} = 0.6$ | $P_{det} = 0.8$ | $P_{det} = 1.0$ |
| $1 \times 10^{-5}$ | 200 | 20,200 | 40,200 | 60,200 | 80,200 | 100,200 |
| $2 \times 10^{-5}$ | 400 | 20,400 | 40,400 | 60,400 | 80,400 | 100,400 |
| $5 \times 10^{-5}$ | 1000 | 21,000 | 41,000 | 61,000 | 81,000 | 101,000 |
| $1 \times 10^{-4}$ | 2000 | 22,000 | 42,000 | 62,000 | 82,000 | 102,000 |
| $2 \times 10^{-4}$ | 4000 | 24,000 | 44,000 | 64,000 | 84,000 | 104,000 |
| $5 \times 10^{-4}$ | 10,000 | 30,000 | 50,000 | 70,000 | 90,000 | 110,000 |
| $1 \times 10^{-3}$ | 20,000 | 40,000 | 60,000 | 80,000 | 100,000 | 120,000 |

The false alarm rate controller 10 of this embodiment of the present invention also includes excess signal detecting means 18 for detecting each excess signal which is received within the predetermined detection interval. The number of excess signals $N_{excess}$ which are received within the predetermined interval can also be computed. In particular, $N_{excess}$ in the absence of source signals can generally be computed as:

$$N_{excess} = T \cdot PRF \cdot P[2] = T \cdot PRF \frac{M(M-1)}{2} P_{fa}^2 \quad (3)$$

wherein P[2] is the probability of detecting two signals in a predetermined transmission period and M= BW/PRF so as to measure the number of opportunities for a false alarm in a transmission period.

In addition, in the presence of source signals, $N_{excess}$ can generally be computed as:

$$N_{excess} = T \cdot PRF \cdot P_{det} \cdot P[1] = T \cdot PRF \cdot P_{det}(M-1) P_{fa} \quad (4)$$

wherein P[1] is the probability of detecting one signal in a predetermined transmission period.

For example, the excess number of detected signals $N_{total}$ received per second by a receiver having an electronic bandwidth a 20 MHz and for source signals having a predetermined transmission frequency of 100 kHz are provided below as functions of $P_{fa}$ and $P_{det}$:

mined detection interval to thereby generate the excess signal count $N_{excess}$. For a detection interval which includes a plurality of transmission periods, the first counter maintains a running count of the total signals received within each transmission period of the detection interval. Likewise, the second counter maintains a running count of the total number of excess signals received in each of the transmission periods of the detection interval.

The false alarm rate controller 10 of the present invention also includes ratio determining means 26, responsive to the total signal detecting means 14 and the excess signal detecting means 18, for determining a ratio of the total number of received signals detected by the total signal detecting means within the predetermined detection interval to the total number of excess signals detected by the excess signal detecting means within the predetermined detection interval. In embodiments in which the false alarm rate controller includes first and second counters 22 and 24, the ratio determining means determines a ratio of the total signal count to the excess signal count.

Based upon equations (1) and (3) above, the ratio, in the absence of source signals, can be computed as:

$$\frac{N_{total}}{N_{excess}} = \frac{2 PRF}{BW \cdot P_{fa}} \quad (5)$$

if it is assumed that M=BW/PRF>>1.

TABLE 2

| | EXCESS COUNTS | | | | | |
|---|---|---|---|---|---|---|
| $P_{fa}$ | $P_{det} = 0.0$ | $P_{det} = 0.2$ | $P_{det} = 0.4$ | $P_{det} = 0.6$ | $P_{det} = 0.8$ | $P_{det} = 1.0$ |
| $1 \times 10^{-6}$ | 0 | 4 | 8 | 12 | 16 | 20 |
| $2 \times 10^{-6}$ | 0 | 8 | 16 | 24 | 32 | 40 |
| $5 \times 10^{-6}$ | 0 | 20 | 40 | 60 | 80 | 99 |
| $1 \times 10^{-5}$ | 0 | 40 | 80 | 119 | 159 | 199 |
| $2 \times 10^{-5}$ | 1 | 80 | 159 | 238 | 317 | 396 |
| $5 \times 10^{-5}$ | 5 | 201 | 397 | 593 | 789 | 985 |
| $1 \times 10^{-4}$ | 19 | 406 | 792 | 1,178 | 1,565 | 1,951 |
| $2 \times 10^{-4}$ | 76 | 826 | 1,576 | 2,326 | 3,076 | 3,825 |
| $5 \times 10^{-4}$ | 446 | 2,159 | 3,873 | 5,586 | 7,299 | 9,012 |
| $1 \times 10^{-3}$ | 1,618 | 4,559 | 7,500 | 10,441 | 13,383 | 16,324 |

According to one embodiment, the false alarm rate controller 10 of the present invention includes a comparator 20 for detecting each received signal which has a power level greater than the predetermined threshold level. The false alarm rate controller of this embodiment also preferably includes first and second counters 22 and 24, responsive to the comparator and to the detection interval timer 16. The first counter counts each signal detected by the comparator within the predetermined detection interval to thereby generate the total signal count $N_{total}$. The second counter counts each excess signal which is received within the predeter- Likewise in the presence of source signals and based upon equations (2) and (4) above, the ratio can be computed as:

$$\frac{N_{total}}{N_{excess}} = \frac{PRF}{BW \cdot P_{fa}} \quad (6)$$

Accordingly, the ratio varies by only a factor of two between instances in which source signals are absent and instances in which source signals are present as shown above in equations (5) and (6), respectively.

Based upon the above example in which the electronic bandwidth of the receiver is 20 MHz and the source signals are transmitted at a transmission frequency of 100 kHz, the ratio of the total signal count to the excess signal count can be computed for a detection interval of one second for a function of $P_{fa}$ and $P_{det}$:

TABLE 3

| | TOTAL/EXCESS COUNT RATIO | | | | | |
|---|---|---|---|---|---|---|
| $P_{fa}$ | $P_{det} = 0.0$ | $P_{det} = 0.2$ | $P_{det} = 0.4$ | $P_{det} = 0.6$ | $P_{det} = 0.8$ | $P_{det} = 1.0$ |
| $1 \times 10^{-6}$ | 10,154 | 5,029 | 5,028 | 5,027 | 5,027 | 5,027 |
| $2 \times 10^{-6}$ | 5,078 | 2,517 | 2,515 | 2,515 | 2,515 | 2,515 |
| $5 \times 10^{-6}$ | 2,032 | 1,009 | 1,008 | 1,007 | 1,007 | 1,007 |
| $1 \times 10^{-5}$ | 1,017 | 507 | 505 | 505 | 505 | 505 |
| $2 \times 10^{-5}$ | 510 | 255 | 254 | 254 | 253 | 253 |
| $5 \times 10^{-5}$ | 205 | 105 | 103 | 103 | 103 | 103 |
| $1 \times 10^{-4}$ | 104 | 54 | 53 | 53 | 52 | 52 |
| $2 \times 10^{-4}$ | 53 | 29 | 28 | 28 | 27 | 27 |
| $5 \times 10^{-4}$ | 22 | 14 | 13 | 13 | 12 | 12 |
| $1 \times 10^{-3}$ | 12 | 9 | 8 | 8 | 7 | 7 |

The constant false alarm rate controller 10 of the present invention also includes threshold adjusting means 28, responsive to the ratio determining means 26, for adjusting the relationship between the power level of the received signals and the threshold level in response to the ratio of the total number of received signals to the total number of excess signals. Accordingly, the false alarm rate of the receiver is thereby controlled. In one preferred embodiment, the threshold adjusting means includes comparison means 30, such as a comparator, for comparing the ratio of the total number of received signals to the total number of excess signals to a predetermined ratio.

According to one embodiment, the threshold adjusting means 28 also includes first adjusting means 32, responsive to the comparison means 30, for decreasing the threshold level if the ratio determined by the ratio determining means 26 is greater than the predetermined ratio. The threshold adjusting means of this embodiment also preferably includes second adjusting means 34, also responsive to the comparison means, for increasing the threshold level if the ratio of the total number of received signals to the total number of excess signals is less than the predetermined ratio. Thus, the false alarm rate controller 10 of the present invention compensates for fluctuations in the noise signals, such as fluctuations due to variations in the noise statistics, such that the false alarm rate of the receiver is controlled and, more particularly, is held at a constant rate.

The false alarm rate controller 10 of the present invention can also include an attenuator 36, such as an RF attenuator, for controllably amplifying the received signals. In particular, the attenuator can selectively increase or decrease the gain of the received signals to thereby change the power level of the received signals. According to this embodiment, the threshold adjusting means 28 preferably includes a controller 38 for controlling the amplification of the received signals provided by the attenuator in response to the ratio of the total number of received signals to the total number of excess signals.

More particularly, one embodiment of the controller 38 includes first adjusting means 32, responsive to the comparison means 30, for increasing the amplification of the attenuator 36 if the ratio of the total number of detected signals to the total number of excess signals is greater than the predetermined ratio. In addition, this embodiment of the controller also preferably includes second adjusting means 34, also responsive to the comparison means, for decreasing the amplification of the attenuator if the ratio of the total number of detected signals to the total number of excess signals is less than the predetermined ratio. Accordingly, this embodiment of the false alarm rate controller 10 also controls the false alarm of the receiver. Thus, the false alarm rate controller provides compensation for fluctuations in the noise signals, such as those due to variations in the noise statistics, such that the false alarm rate of the receiver is controlled and, more particularly, is held at a constant rate.

The false alarm rate controller 10 of the present invention can also include suppression means 40 for suppressing further detections by the comparator 30 for a predetermined delay time following the detection of each received signal by the comparator. Accordingly, the false alarm rate controller of this embodiment of the present invention will not count a detected signal more than once.

Typically, the ratio determining means 26 and the threshold adjusting means 28 are embodied in a microprocessor or microcontroller. In addition, the detection interval timer 16 can be embodied in the microprocessor or microcontroller. However, the detection interval timer can, instead, be an external timer without departing from the spirit and scope of the present invention. In addition, the controller 38 of the threshold adjusting means can include a digital to analog converter and an associated amplifier for converting the digital signals received from the threshold adjusting means to appropriately scaled digital signals for controlling the attenuator 36.

Figure 3A:
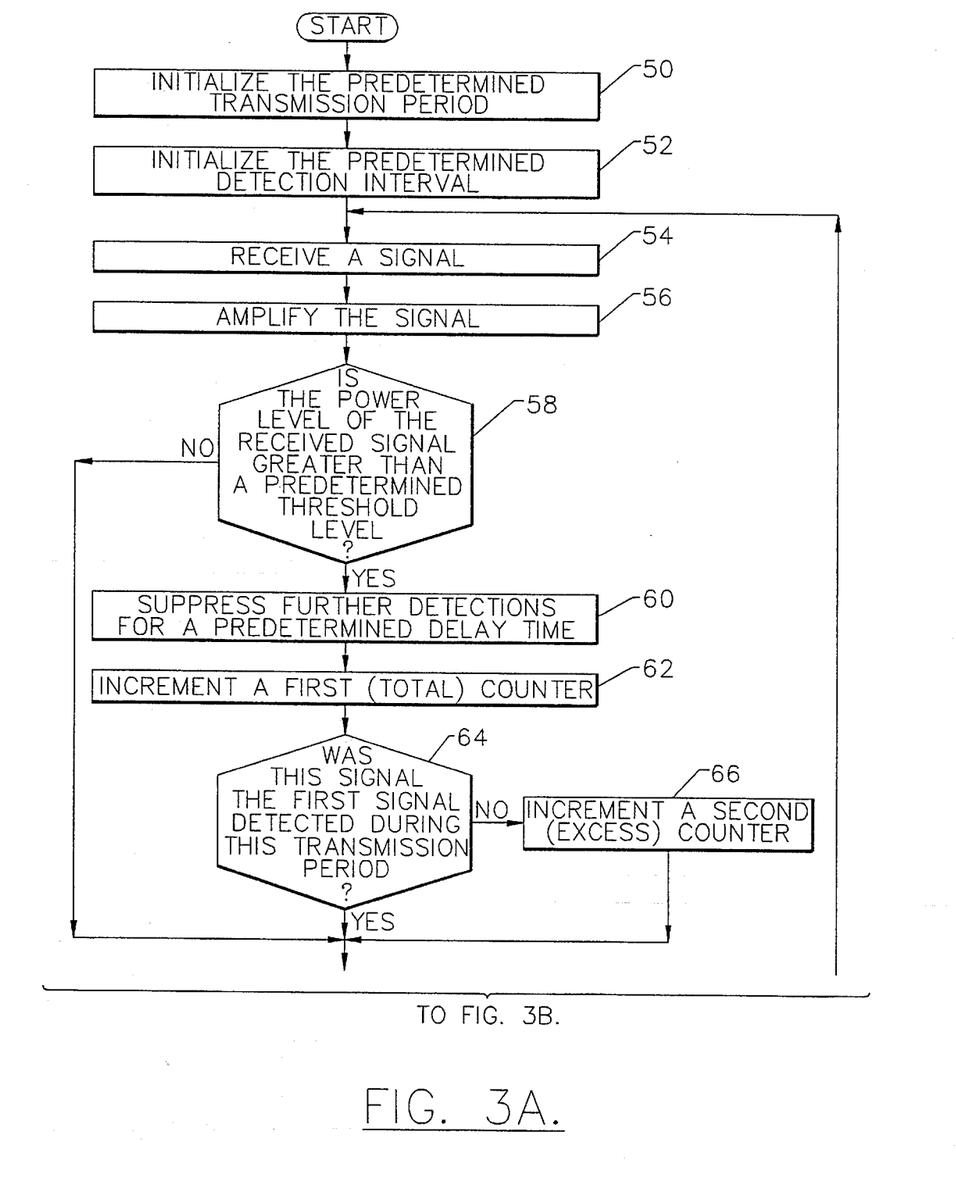
FIGS. 3A and 3B illustrate detailed operations for controlling the false alarm rate of a receiver according to the present invention.
Figure 3B:
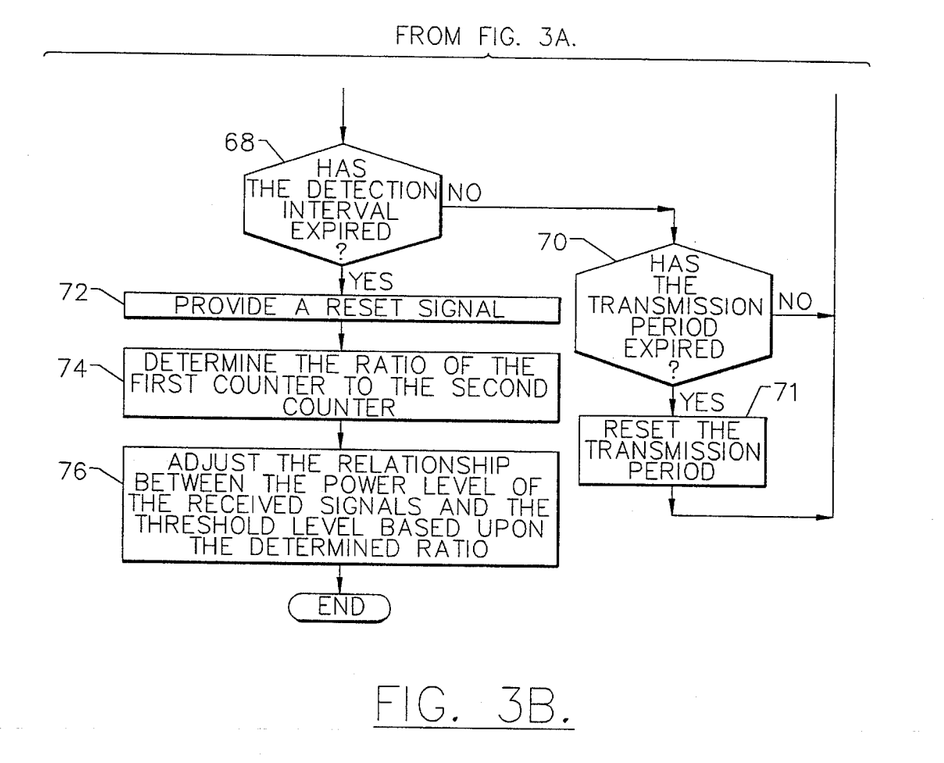

According to the detailed operations illustrated in FIGS. 3A and 3B, the method of controlling the false alarm rate of a receiver generally includes the steps of initializing the predetermined transmission period and initializing the predetermined detection interval as shown in blocks 50 and 52, respectively. Thereafter, the false alarm rate controller 10 receives and amplifies incoming signals, such as by the receiving means 12 and the associated attenuator 36, respectively, as shown in blocks 54 and 56. The power level of the received signal is then compared to a predetermined threshold level as illustrated in block 58. If the power level of the received signal is greater than the predetermined threshold level further detections are suppressed, by the suppression means 40, for a predetermined delay time and a first counter 22 which counts the total number of received signals is incremented, as shown in blocks 60 and 62.

Thereafter, the false alarm rate controller determines if the detected signal was the first or initial signal which was detected during the current transmission period, as shown in block 64. If the detected signal was not tile first or initial signal detected during the current transmission period but, was, instead, the second or greater signal detected during the current transmission period, a second counter 24 is incremented to count the total number of excess signals received as illustrated in block 66.

Regardless of whether the power level of the received signal was greater than the predetermined threshold level, the false alarm rate controller 10 of the present invention thereafter determines if the detection interval has expired as illustrated in block 68. If the detection interval has not expired, the false alarm rate controller determines if the transmission period has expired as shown in block 70. If the detection interval has not expired, but the transmission period has expired, the transmission period is reset as shown in block 71. Thereafter, the false alarm rate controller of the present invention waits to receive the next signal.

If, however, the detection interval has expired, a reset signal is provided by the detection interval timer 16 and the ratio of the first counter 22, which counts the total number of detected signals, to the second counter 24, which counts the total number of excess signals, is determined as shown in blocks 72 and 74, respectively. Thereafter, the relationship between the power level of the received signals and the threshold level is adjusted based upon the determined ratio as illustrated in block 76.

Figure 4:
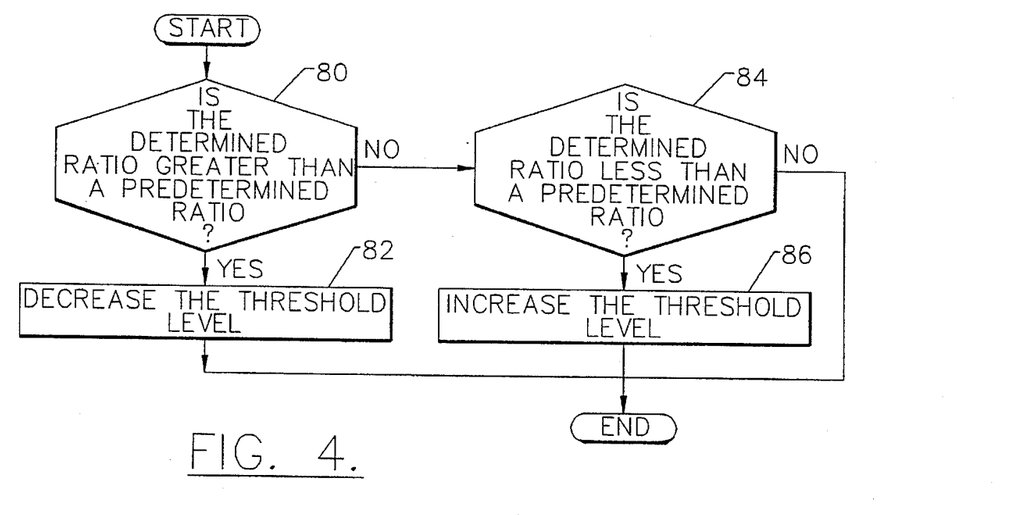
FIG. 4 illustrates detailed operations of one method of adjusting the relationship between the power level of the received signals and the threshold level.

The manner in which the false alarm rate controller 10 adjusts the relationship between the power level of the received signals and the threshold level based upon the determined ratio of the first counter 22 to the second counter 24 can be performed in several ways without departing from the spirit and scope of the present invention. In particular, a first method of adjusting the relationship between the power level of the received signals and the threshold level is illustrated in FIG. 4 in which the determined ratio is compared to the predetermined ratio, as shown in block 80. If the determined ratio is greater than the predetermined ratio, the threshold level is decreased, as illustrated in block 82. If, however, the determined ratio is not greater than the predetermined ratio, the false alarm rate controller, instead, determines if the ratio is less than the predetermined ratio, as shown in block 84. And, as illustrated in block 86, if the determined ratio is less than the predetermined ratio, the threshold level is increased. Accordingly, the false alarm rate of the receiver is controlled and, more preferably, is held at a constant rate.

Figure 5:
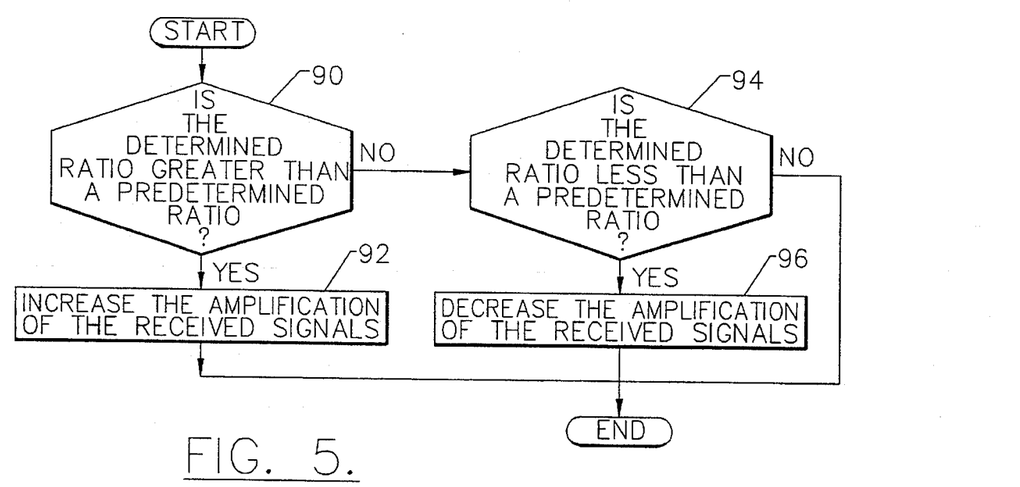
FIG. 5 illustrates detailed operations of a second method of adjusting the relationship between the power level of the received signals and the threshold level.

A second method of adjusting the relationship between the power level of the received signals and the threshold level is illustrated in FIG. 5 in which the determined ratio is again initially compared to the predetermined ratio, as illustrated in block 90. If the determined ratio is greater than the predetermined ratio, the amplification provided by the attenuator 36 to the received signals is increased, as illustrated in block 92. However, if the determined ratio is not greater than the predetermined ratio, the false alarm rate controller 10 determines if the determined ratio is less than the predetermined ratio, as shown in block 94. And, as illustrated in block 96, if the determined ratio is less than the predetermined ratio, the amplification provided by the attenuator to the received signals is decreased. Accordingly, the false alarm rate of the receiver is controlled and, more preferably, is held at a constant rate.

By adjusting the relationship of the power level of the received signals and the threshold level in response to a ratio of the total number of received signals to the total number of excess signals, the probability that the power level of the noise signals exceeds the detection threshold at any given time is stabilized in comparison with conventional false alarm rate controllers. For example, some conventional false alarm rate controllers which are employed in conjunction with receivers adapted to receive the signals at a relatively low pulse rate count the number of excess returns and adjust the threshold level in response to the number of excess returns. These conventional false alarm rate controllers are susceptible to fluctuations in the probability of detecting a true signal $P_{det}$, particularly at relatively low false alarm rates. As illustrated in Table 2 above, for a given number of excess counts, the probability $P_{det}$ that the noise exceeds the threshold level at any given time varies greatly as the probability of detecting a true signal $P_{det}$ fluctuates. For example, for an excess count of 20, the probability $P_{fa}$ that the noise exceeds the threshold level at any given time varies 100 times, that is, from $1\times10^{-6}$ to $1\times10^{-4}$, as the probability of detecting a true signal $P_{det}$ varies from 1.0 to 0.0, respectively.

However, by basing the adjustment of the threshold level on a ratio of the total number of detected signals to the total number of excess signals, the probability $P_{fa}$ that the noise exceeds the threshold level at any given time varies much less with the probability of detecting a true signal $P_{det}$. In particular, as illustrated in Table 3 above, the probability $P_{fa}$ that the noise exceeds the threshold level at any given time typically varies by only a factor of 2 as the probability of detecting a true signal $P_{det}$ varies from 0.0 to 1.0. In addition, for probabilities of detecting a true signal $P_{det}$ of 0.2 or greater, the probability $P_{fa}$ that the noise exceeds the threshold level at any given time does not significantly change. In addition, the method and apparatus for controlling the false alarm rate of a receiver according to the present invention does not depend upon the predetermined transmission frequency but, can be employed with transmission sources having relatively high transmission frequencies.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An apparatus for controlling the false alarm rate of a receiver wherein the receiver is adapted to receive signals in response to source signals which are transmitted at a predetermined transmission frequency, thereby defining a predetermined transmission period between source signals, the apparatus comprising:

total signal detecting means for detecting each received signal which has a power level greater than a predetermined threshold level and which is received within a predetermined detection interval, wherein the predetermined detection interval includes at least one predetermined transmission period, and wherein the signals received within a predetermined transmission period can include an initial signal which has a power level greater than the predetermined threshold level and a plurality of excess signals received subsequent to the initial signal which also have a power level greater than the predetermined threshold level;

excess signal detecting means for detecting each excess signal which is received within the predetermined detection interval;

ratio determining means, responsive to said total signal detecting means and said excess signal detecting means, for determining a ratio of the total number of received signals detected by said total signal detecting means within the predetermined detection interval to the total number of excess signals detected by said excess signal detecting means within the predetermined detection interval; and threshold adjusting means, responsive to said ratio determining means, for adjusting the threshold level in response to the ratio determined by said ratio determining means such that the false alarm rate of the receiver is thereby controlled.

2. An apparatus according to claim 1 further comprising receiving means for receiving a plurality of signals including true signals transmitted in response to the source signals and noise signals.

3. An apparatus according to claim 1 wherein said threshold adjusting means comprises comparison means for comparing the ratio determined by said ratio determining means to a predetermined ratio.

4. An apparatus according to claim 3 wherein said threshold adjusting means further comprises:

first adjusting means, responsive to said comparison means, for decreasing the threshold level if the ratio determined by said ratio determining means is greater than the predetermined ratio; and second adjusting means, responsive to said comparison means, for increasing the threshold level if the ratio determined by said ratio determining means is less than the predetermined ratio.

5. An apparatus for controlling the false alarm rate of a receiver wherein the receiver is adapted to receive signals in response to source signals which are transmitted at a predetermined transmission frequency, thereby defining a predetermined transmission period between source signals, the apparatus comprising:

a comparator for detecting each received signal which has a power level greater than a predetermined threshold level, wherein the signals detected within a predetermined transmission period can include an initial signal and a plurality of excess signals detected subsequent to the initial signal;

a detection interval timer for measuring a predetermined detection interval, wherein the predetermined detection interval includes at least one predetermined transmission period;

a first counter, responsive to said comparator and said detection interval timer, for counting each signal detected by said comparator within the predetermined detection interval to thereby generate a total signal count;

a second counter, responsive to said comparator and said detection interval timer, for counting each excess signal which is received within the predetermined detection interval to thereby generate an excess signal count;

ratio determining means, responsive to said first and second counters, for determining a ratio of the total signal count to the excess signal count; and threshold adjusting means, responsive to said ratio determining means, for adjusting a relationship between the power level of the received signals and the threshold level in response to the ratio determined by said ratio determining means such that the false alarm rate of the receiver is thereby controlled.

6. An apparatus according to claim 5 further comprising an attenuator for controllably amplifying the received signals.

7. An apparatus according to claim 6 wherein said threshold adjusting means comprises a controller for controlling the amplification of the received signals provided by said attenuator in response to the ratio determined by said ratio determining means such that the false alarm rate of the receiver is thereby controlled.

8. An apparatus according to claim 7 wherein said threshold adjusting means further comprises comparison means for comparing the ratio determined by said ratio determining means to a predetermined ratio.

9. An apparatus according to claim 8 wherein said controller comprises:

first adjusting means, responsive to said comparison means, for increasing the amplification of said attenuator if the ratio determined by said ratio determining means is greater than the predetermined ratio; and second adjusting means, responsive to said comparison means, for decreasing the amplification of said attenuator if the ratio determined by said ratio determining means is less than the predetermined ratio.

10. An apparatus according to claim 5 further comprising suppression means for suppressing further detections by said comparator for a predetermined delay time following the detection of each received signal by said comparator.

11. A method of controlling the false alarm rate of a receiver wherein the receiver is adapted to receive signals in response to source signals which are transmitted at a predetermined transmission frequency, thereby defining a predetermined transmission period between source signals, the method comprising the steps of:

detecting each received signal which has a power level greater than a predetermined threshold level and which is received within a predetermined detection interval, wherein the predetermined detection interval includes at least one predetermined transmission period, and wherein the signals detected within a predetermined transmission period can include an initial signal and a plurality of excess signals received subsequent to the initial signal;

detecting each excess signal which is received within the predetermined detection interval;

determining a ratio of the total number of signals detected within the predetermined detection interval to the total number of excess signals detected within the predetermined detection interval; and adjusting a relationship between the power level of the received signals and the threshold level in response to the determined ratio of the total number of signals to the total number of excess signals such that the false alarm rate of the receiver is thereby controlled.

12. A method according to claim 11 wherein said adjusting step further comprises the step of comparing the ratio of the total number of signals to the total number of excess signals to a predetermined ratio.

13. A method according to claim 12 wherein said adjusting step comprises the steps of:

decreasing the threshold level if the ratio of the total number of signals to the total number of excess signals is greater than the predetermined ratio; and increasing the threshold level if the ratio of the total number of signals to the total number of excess signals is less than the predetermined ratio.

14. A method according to claim 12 further comprising the step of controllably amplifying the received signals.

15. A method according to claim 14 wherein said adjusting step includes the step of controlling the amplification of the received signals in response to the ratio of the total number of signals to the total number of excess signals such that the false alarm rate of the receiver is thereby controlled.

16. A method according to claim 15 wherein said step of controlling the amplification of the received signals comprises the steps of:

increasing the amplification of the received signals if the ratio of the total number of signals to the total number of excess signals is greater than the predetermined ratio; and decreasing the amplification of the received signals if the ratio of the total number of signals to the total number of excess signals is less than the predetermined ratio.

17. A method according to claim 11 wherein said step of detecting each received signal comprises the step of counting each signal detected within the predetermined detection interval to thereby generate a total signal count.

18. A method according to claim 11 wherein said step of detecting each excess signal comprises the step of counting each excess signal detected within the predetermined detection interval to thereby generate an excess signal count.

19. A method according to claim 11 further comprising the steps of:

measuring the predetermined detection interval; and providing a reset signal upon the expiration of each predetermined detection interval.

20. A method according to claim 11 wherein said step of detecting each received signal further comprises the step of suppressing further detections for a predetermined delay time following the detection of each received signal.

* * * * *